J. P. LECRONE.
CLUTCH PEDAL LOCKING DEVICE FOR FORD CARS.
APPLICATION FILED DEC. 17, 1921.
1,425,989.
Patented Aug. 15, 1922.
2 SHEETS—SHEET 1.
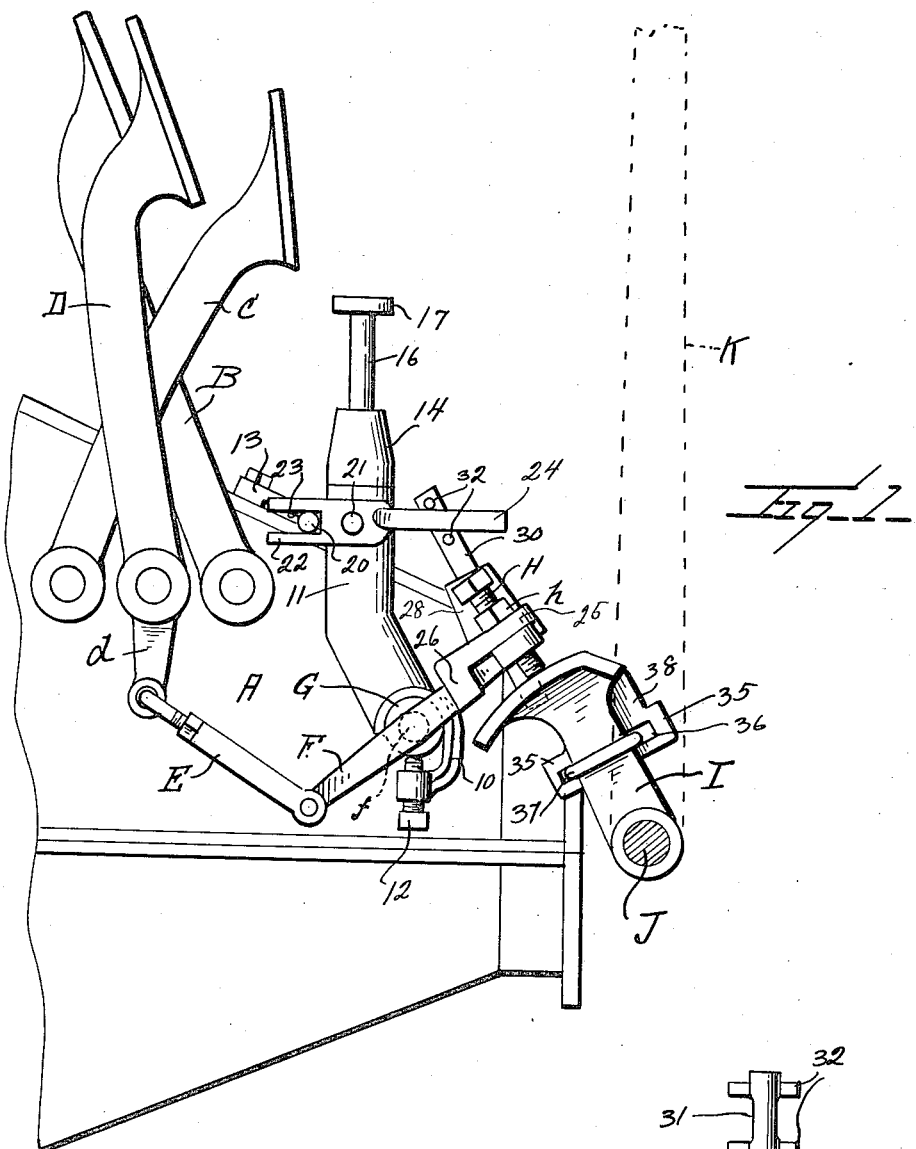
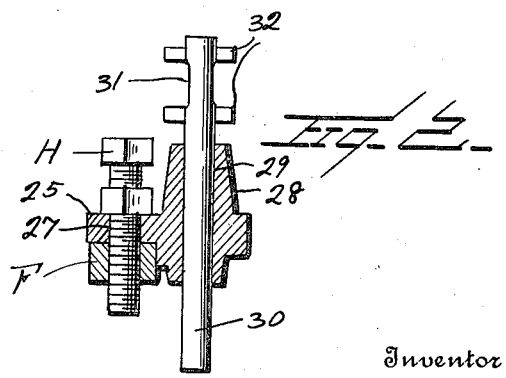
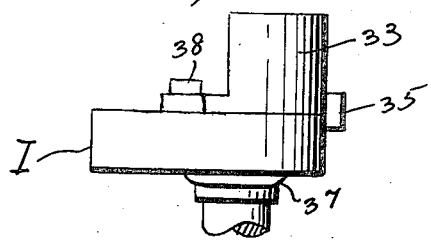
Inventor
J. P. Lecrone
By Watson E. Coleman
Attorney

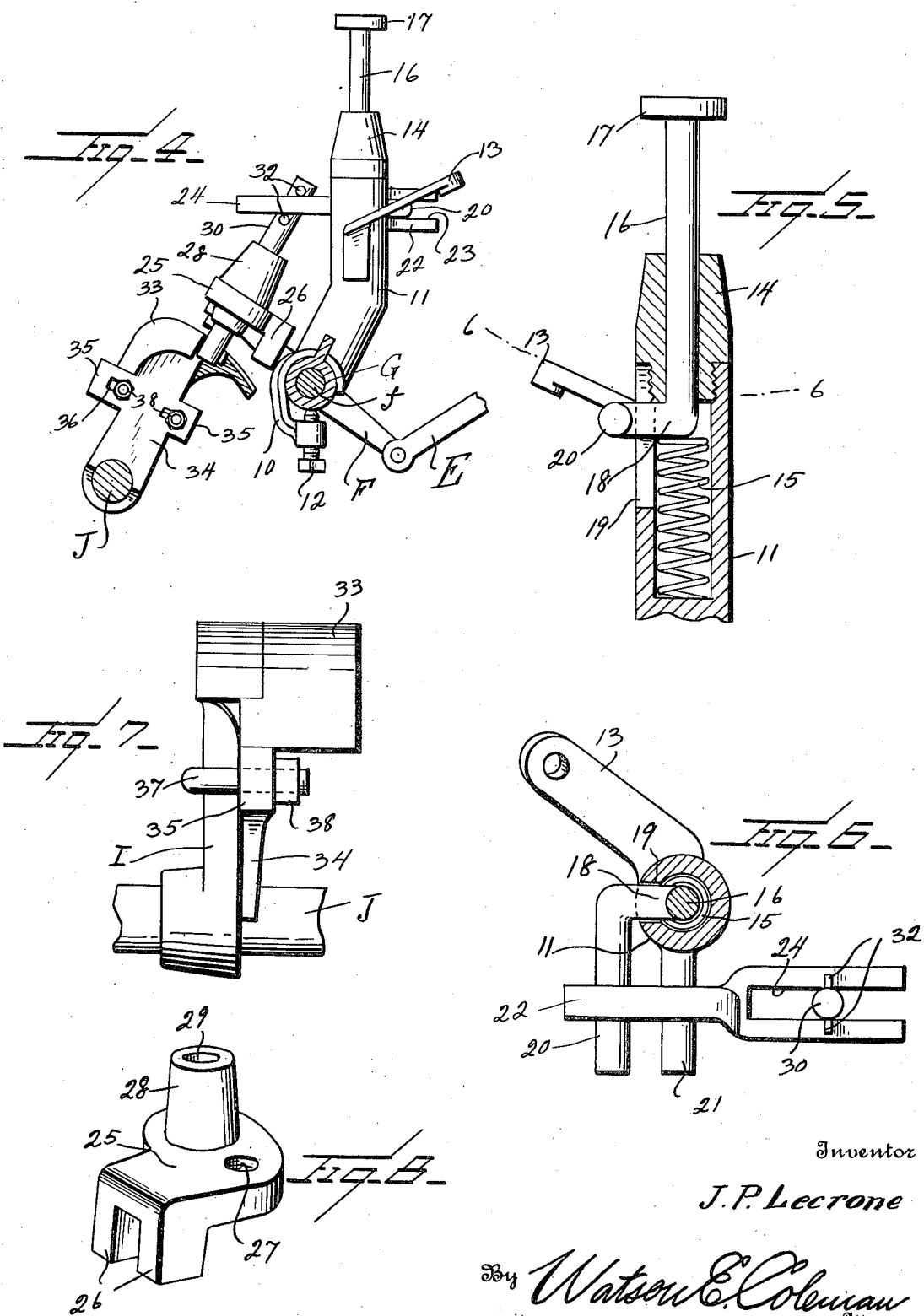

UNITED STATES PATENT OFFICE.

JOHN P. LECRONE, OF YORK, PENNSYLVANIA.

CLUTCH-PEDAL-LOCKING DEVICE FOR FORD CARS.

1,425,989. Specification of Letters Patent. Patented Aug. 15, 1922.

Application filed December 17, 1921. Serial No. 523,026.

*To all whom it may concern:*

Be it known that I, JOHN P. LECRONE, a citizen of the United States, residing at York, in the county of York and State of Pennsylvania, have invented certain new and useful Improvements in Clutch-Pedal-Locking Devices for Ford Cars, of which the following is a specification, reference being had to the accompanying drawings.

This invention relates to devices for locking the clutch pedal and emergency lever of a Ford car in a predetermined position, and particularly to means for holding the clutch pedal and emergency lever in their neutral position and preventing the clutch pedal from shifting into high gear when the motor is running and the car is standing still.

The general object is to provide a construction of this character which is very simple, which may be easily applied to Ford cars, and which is positive in its action to attain the function heretofore stated.

A further object is to provide a construction of this character wherein the locking device may be readily thrown out of action by the depression of a foot actuated plunger.

Another object is to provide a device of this character which requires no change in the construction of the car and which may be readily applied to the speed controlling mechanism of the car.

Other objects will appear in the course of the following description.

My invention is illustrated in the accompanying drawings, wherein:—

Figure 1 is a side elevation of the gear case of a Ford car with the several pedals thereof and showing my device in applied position, the emergency lever being shown in dotted lines;

Figure 2 is a fragmentary sectional view on the line 2—2 of Figure 4;

Figure 3 is a top plan view of the stop ordinarily found upon the Ford car and connected to the emergency lever and of the stop which I provide for preventing the speed controlling parts from moving into a high speed position;

Figure 4 is a fragmentary side elevation of a portion of the mechanism illustrated in Figure 1, but looking from the opposite side of the machine;

Figure 5 is a fragmentary sectional view through the plunger casing;

Figure 6 is a sectional view on the line 6—6 of Figure 5 and showing a stop actuated fork;

Figure 7 is a rear elevation of the emergency lever shaft, the stop carried thereby, and the auxiliary stop used by me;

Figure 8 is a perspective view of the bolt supporting casting;

In these figures, I have illustrated the rear portion of the gear case A of a Ford car and having thereon the usual three pedals B, C and D, the pedal B being the reverse pedal, the pedal C being the brake pedal, and the pedal D being the clutch pedal. The pedal D extends, as at $d$, beyond its bearing and is connected by a link E to the usual lever F which is mounted upon a transverse rock shaft $f$ carried in a suitable bearing G. The outer arm of this lever F as usual is screw-threaded for the passage of the screw-threaded stop H in the form of a bolt held in locked position by the nut lock $h$. This stop engages with the usual speed lever I mounted upon the speed controlling shaft J, upon which the emergency brake lever K is mounted. All these parts are of usual construction and found on automobiles of the type stated. In controlling speed for the mechanism, as above described, the gears are held in a neutral position by holding the clutch pedal D in a neutral position with the foot, and if it be desired to start the car the hand lever K is thrown forward, while the clutch pedal is held in a neutral position, and then the clutch pedal is pressed forward into slow speed. This forward movement of the clutch pedal rocks the clutch lever F so as to raise the stop pin H. The pedal is then allowed to drop back slowly into high speed, thus depressing the pin H, which depression is permitted if the speed lever I is thrown forward. Under normal circumstances, however, when the clutch lever is in neutral position, as for instance when the engine is idling, there is a possibility of the lever K and of the speed lever I being moved forward and thus permitting the clutch lever F and the parts connected therewith to drop into high.

Many accidents have occurred under these circumstances and, as before stated, the general object of my invention is to prevent this accidental movement of the speed lever and the accidental movement of the speed controlling mechanism into a high speed position. To this end, I mount upon a bracket 10, which is formed to embrace the bearing G, the tubular plunger casing 11. The lower end of this plunger casing is formed to provide the bracket 10 and the lower end of this bracket is screw-threaded for the reception of a set screw 12 which engages with the bearing G. The upper end of this plunger casing extends vertically and is provided with an arm 13 which is adapted to be held by bolts to the upper face of the gear casing A, thus supporting the plunger casing in a vertical position. The upper end of the plunger casing is normally closed by a cap 14 which has screw-threaded engagement with the plunger casing, as illustrated in Figure 5. As also illustrated in Figure 5, the interior of the plunger casing is hollow for a certain distance to contain a spring 15, and disposed through the cap 14 is a plunger 16 having the head 17, to which the foot may be applied, the lower end of this plunger being angularly bent, as at 18, and extending out through a slot 19 in the plunger casing. This angularly bent portion 18 at its extremity is again angularly turned, as at 20, and extends laterally from the plunger casing. Mounted upon the plunger casing and forming part thereof is a pivot stud 21, the lateral extension 20 of the plunger being parallel to this stud. Rockingly mounted upon this stud 21 is a lever 22 which has a vertically extending fork which is bifurcated at one end, as at 23, to embrace the lateral extension 20 of the plunger 16 and at the opposite end this lever 22 is formed with a relatively long fork 24. Thus upon the depression of the plunger, the forked end 24 of the lever will be raised and upon a release of pressure upon the top of the plunger, the spring 15 will cause the plunger to move upward, which will depress the arm 24 of the lever.

Mounted upon the extremity of the clutch lever F is a casting illustrated in Figure 8 and designated 25, which casting is formed to rest upon the top of the lever and is provided with the downwardly extending spaced lugs 26 to embrace the lever F and is also provided with the perforation 27 through which the stop screw H is adapted to pass, the nut h bearing upon the upper face of the casting 25. Inward of this perforation 27 the casting 25 is formed with the upwardly extending boss 28, through which is formed a vertical passage 29. Sliding through this passage 29 is a bolt 30 in the form of a rod whose form is best shown in Figure 2, this rod being reduced in thickness, as at 31, and formed above and below this reduced portion with the transverse pins 32. These pins are spaced far enough apart so as to admit the tines of the fork 24 between the pins and permit the tines to have a rocking movement with relation to the bolt. The flat faces 31 prevent any rotation of this locking bolt between the tines 24 but hold the bolt in the position shown in Figure 6.

Mounted upon the side face of the speed lever I is a substantially arcuate head 33 which is relatively wide, as shown in Figure 7, and which extends down rearward of the head of the speed lever, this head being carried upon and laterally projecting from an arm 34, which arm at its lower end is formed to partially embrace the controlling shaft J. This arm midway of its length extends forward and rearward to form lugs 35, and specifically these lugs are longitudinally slotted at three points, as at 36, for the reception of the ends of the U-shaped clamping bolt 37 which extends around the arm of the speed lever I, as illustrated in Figures 1 and 7, and extends through these slots 36, this clamp being provided with nuts 38. Thus the arm 34 and the head 33 may be clamped firmly upon the speed lever and the slots 36 permit the adjustment of this arm with reference to the speed lever.

It will be noted from Figure 4 that in the neutral position of the parts, the bolt 30 will extend down in front of the head 33, which thus constitutes a stop preventing the forward movement of the speed lever from a neutral position, but that by a depression of the plunger 16 the lever 22 will be rocked and will lift the bolt 30 out of its locking position so as to permit the forward movement of the speed lever and of the emergency brake lever K. Thus when the engine is running but the clutch is thrown out and in neutral position, as shown in Figure 1, it is impossible for the speed lever to be shifted accidentally forward and thus permit the clutch to shift the transmission mechanism to its high speed position. Of course, this mechanism which I have described does not in any way interfere with the usual operation of the transmission mechanism of the Ford car. The speed lever acts in precisely the same manner as it usually does to normally prevent the movement of the clutch from its neutral position, but my device locks this speed lever from any accidental forward movement. It is impossible with my mechanism when the motor is running and the car is standing still for the gears to jump into high, yet a pressure on the head 17 releases the locking device and the parts may be actuated in the usual manner.

It will be noted that the bolt 30 holds against the head of the speed lever or rather against the auxiliary head 33 of the speed lever when the emergency lever is pulled back and the transmission mechanism is thrown out of gear and to get the transmission mechanism in gear again the pedal formed by the plunger 16 is depressed and then the emergency lever is moved forward and the bolt 30 rides on top of the head 33 at all times when the lever is forward. When the lever is pulled back, the bolt 30 drops in front of the head 33 and holds the emergency lever in its retracted position. The head 33 and the arm 34 upon which the head is carried is adjustable on the speed lever because the emergency lever does not move to exactly the same place on all Fords. The screw H is to be set to its proper adjustment and then the lock nut h tightened up, which holds the screw firmly in place.

While I have illustrated details of construction and arrangement of parts which I believe to be particularly effective, I do not wish to be limited to these details, as it is obvious that many changes might be made without departing from the spirit of the invention.

I claim:—

1. In a motor vehicle, a clutch lever, a speed lever, shiftable means carried by the clutch lever operatively engaging the speed lever when the latter is in a neutral position and preventing the accidental forward movement of the speed lever, and pedally operated means for releasing the shiftable means from its engagement with the speed lever.

2. In a motor vehicle, a clutch lever, a speed lever, shiftable means carried by the clutch lever and rocking therewith and adapted to operatively engage the speed lever when the latter is in its neutral position and prevent the accidental forward movement of the speed lever, a spring urging said shiftable means in a projected and obstructing position, and pedally operated means for retracting the shiftable means from its projected position.

3. In a motor vehicle, a clutch lever, a speed lever, means carried by the speed lever preventing movement of the clutch lever from its neutral position, shiftable means carried by the clutch lever and operatively engaging the speed lever when the latter is in its neutral position to prevent the accidental forward movement of the speed lever, a fixed, pedally operated plunger operatively engaged with the shiftable means to shift it from its projected position upon a depression of the plunger, and a spring urging the plunger to a projected position.

4. In a motor vehicle, a clutch lever, a speed lever, means carried by the speed lever for preventing movement of the clutch lever from its neutral position when the speed lever is in a neutral position or retracted position, means carried by the clutch lever adapted to prevent the accidental forward movement of the speed lever from a neutral or fully retracted position comprising a vertically shifting locking bolt carried upon the clutch lever and rocking therewith, a spring urging the locking bolt into a position of operative engagement with the speed lever to prevent its accidental forward movement, and a foot operated plunger operatively engaged with the bolt to retract it against the force of said spring when the plunger is depressed.

5. In a motor vehicle, a clutch lever, a speed lever, the latter having a head preventing movement of the clutch lever from its neutral position when the speed lever is in its neutral or retracted position, means for preventing the accidental forward movement of the speed lever when in its neutral or retracted position comprising a spring projected bolt mounted upon the clutch lever and adapted to operatively engage the speed lever and prevent its forward movement, a spring projecting said bolt into the path of movement of the speed lever, a rigidly mounted plunger casing, and a plunger carried in said casing and having operative engagement with the bolt to cause the retraction of the bolt upon a depression of the plunger, said operative engagement permitting the rocking of the bolt with relation to the plunger casing and plunger as the clutch lever is rocked.

6. In a motor vehicle, a clutch lever, a speed lever, means carried by the speed lever preventing movement of the clutch lever from a neutral position when the speed lever is in its neutral or retracted position, means for preventing the accidental forward movement of the speed lever comprising a shiftable locking bolt operatively supported upon the clutch lever, a fixed plunger casing, a lever pivoted upon the plunger casing and having rocking and sliding engagement with the locking bolt, a foot operated plunger operating within the casing and operatively engaging said lever to rock it, and a spring normally urging said plunger upward.

7. In a motor vehicle, a clutch lever, a speed lever, means carried by the speed lever preventing movement of the clutch lever from its neutral position when the speed lever is in a retracted or neutral position, a vertically shiftable locking bolt carried upon the end of the clutch lever and adapted to be projected into a position in front of the speed lever to prevent the forward movement of the speed lever, a vertically disposed plunger casing, a lever pivoted upon the exterior of the plunger casing and having at one end a rearwardly extending fork, the shank of the bolt extending within said fork and being provided with a pair of pins between which the fork operates, a foot operated plunger in said plunger casing, a spring urging said plunger upward, and a laterally extending finger on the plunger operatively engaging with said last named lever, the rotation of said plunger under the action of the spring depressing said bolt and the depression of the plunger raising the bolt.

8. In a motor vehicle, a clutch lever, a shaft therefor, a bearing for the shaft, a speed lever having a head adapted to be disposed beneath the free end of the clutch lever and preventing the downward movement of the clutch lever when the speed lever is in its neutral or retracted position, means preventing the accidental forward movement of the speed lever comprising a bolt shiftable through the extremity of the clutch lever, a plunger casing operatively supported at one end upon the bearing for the clutch lever, a lever pivoted upon the casing and at one end having rocking and sliding engagement with the bolt, a foot operated plunger operating within the casing and having a finger projecting exteriorly to the casing and engaging the other end of said last named lever, and a spring urging said plunger upward and thereby urging the bolt outward to obstruct the movement of the speed lever in one direction, the speed lever at its upper end having a laterally projecting shoulder with which said bolt is adapted to engage.

9. An attachment for preventing the accidental forward movement of the speed lever of a motor car comprising a guide member adapted to be mounted upon the extremity of the clutch lever of the car, a vertically movable bolt mounted therein, a member adapted to be mounted upon the speed lever of the car and formed to provide a head formed with a laterally projecting shoulder adapted to be normally engaged by the bolt, a plunger casing having means whereby it may be rigidly supported in a vertical position upon the car, a lever mounted upon the plunger casing and having one end operatively engaged with said bolt, a plunger mounted within the casing and operatively engaged with the other end of said lever, and a spring urging said plunger upward.

10. An attachment for preventing the accidental forward movement of the speed lever, of a motor car comprising a guide member adapted to be mounted upon the extremity of the clutch lever of the car, a vertically movable bolt mounted therein, a member adapted to be mounted upon the speed lever of the car and formed to provide a head formed with a laterally projecting shoulder adapted to be normally engaged by the bolt, said member having means whereby it may be adjusted forward or rearward with relation to the speed lever, a plunger casing having means whereby it may be rigidly supported in a vertical position upon the car, a lever mounted upon the plunger casing and having one end operatively engaged with said bolt, a plunger mounted within the casing and operatively engaged with the other end of said lever, and a spring urging said plunger upward.

11. An attachment for preventing the accidental forward movement of the speed lever of a motor car comprising a guide member adapted to be mounted upon the extremity of the clutch lever of the car, a vertically movable bolt mounted therein, a member adapted to be mounted upon the speed lever of the car and formed to provide a head formed with a laterally projecting shoulder adapted to be normally engaged by the bolt, a plunger casing having means whereby it may be rigidly supported in a vertical position upon the car, a lever mounted upon the plunger casing and having one end formed with a horizontally extending fork, the upper end of the bolt being disposed within said fork and having laterally projecting pins engaging loosely above and below the fork, the opposite end of the lever being bifurcated, a plunger mounted within the plunger casing and having a laterally projecting finger engaged in the last named bifurcation, and a spring urging said plunger upward.

12. An attachment for preventing the accidental forward movement of the speed lever of a motor car comprising a guide member adapted to be mounted upon the extremity of the clutch lever of the car, a vertically movable bolt mounted therein, a member adapted to be mounted upon the speed lever of the car and formed to provide a head formed with a laterally projecting shoulder adapted to be normally engaged by the bolt, a plunger casing, the plunger casing being formed at its lower end with a bracket adapted to embrace the bearing of a clutch lever and adjacent its upper end being formed with a laterally projecting arm adapted to be engaged with the car, a lever mounted upon the plunger casing and having one end operatively engaged with said bolt, a plunger mounted within the casing and operatively engaged with the other end of said lever, and a spring urging said plunger upward.

13. An attachment for preventing the accidental forward movement of the speed lever of a motor car comprising a guide member adapted to be mounted upon the extremity of the clutch lever of the car, a vertically movable bolt mounted therein, a member adapted to be mounted upon the speed lever of the car and formed to provide a head and a shank, the shank being adapted to lie against the speed lever and having horizontally disposed slots, the head being formed to provide a laterally projecting shoulder, a U-shaped clamping bolt passing through said slots and adapted to clamp the speed lever and permit the adjustment of said member, a plunger casing having means whereby it may be rigidly supported in a vertical position upon the car, a lever mounted upon the plunger casing and having one end operatively engaged with said bolt, a plunger mounted within the casing and operatively engaged with the other end of said lever, and a spring urging said plunger upward.

14. A locking device of the character described comprising an element movable to and from a locking position with the movements of the clutch lever, a coacting element adapted to be thrown to a position to be engaged by the first mentioned element by the turning of the controller shaft in the movement of applying the brake and permitting the reverse movement of the controller shaft without releasing said coacting element, and pedally operated means for releasing said last named element.

In testimony whereof I hereunto affix my signature.

JOHN P. LECRONE.